Figure 1:
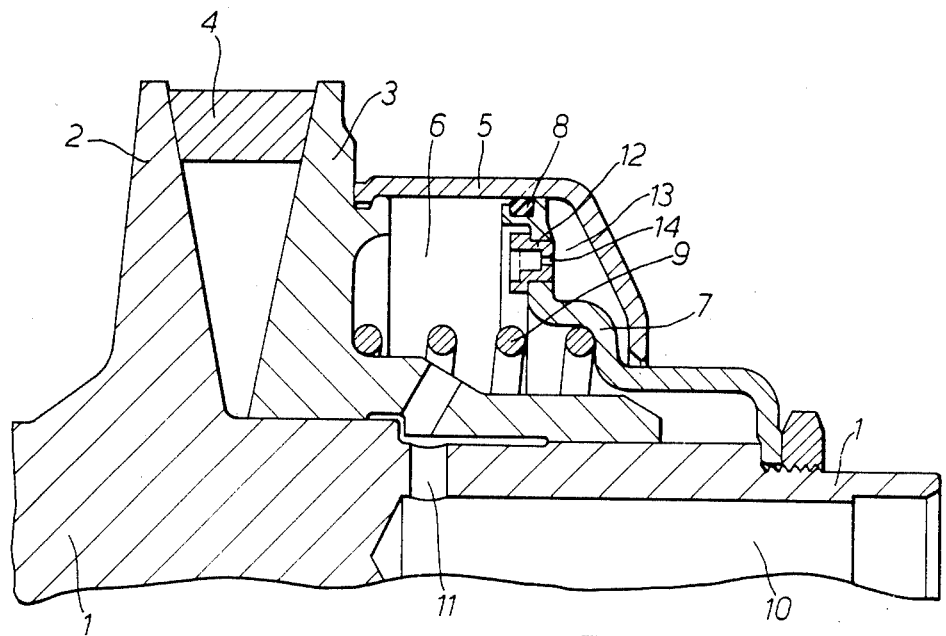

United States Patent [19]

Lamers

[11] Patent Number: 4,575,364
[45] Date of Patent: Mar. 11, 1986

[54] INFINITELY VARIABLE TRANSMISSION

[75] Inventor: Hendricus F. Lamers, Goirle, Netherlands

[73] Assignee: Van Doorne's Transmissie B.V., Tilburg, Netherlands

[21] Appl. No.: 620,255

[22] Filed: Jun. 13, 1984

[30] Foreign Application Priority Data

Jun. 13, 1983 [NL] Netherlands ............... 8302089

[51] Int. Cl.$^4$ ............................. F16H 11/06
[52] U.S. Cl. .............................. 474/16; 474/28; 137/550
[58] Field of Search ............ 474/16, 13, 28, 8, 18; 137/550; 184/15.1

[56] References Cited

U.S. PATENT DOCUMENTS

| 1,890,984 | 12/1932 | Gulick | 184/6.24 |
|---|---|---|---|
| 1,957,344 | 5/1934 | Joiner | 137/550 |
| 2,363,754 | 11/1944 | Smith et al. | 184/72 |
| 3,057,115 | 10/1962 | Bilanin | 137/550 |
| 3,108,610 | 10/1963 | De See | 137/550 |
| 3,446,226 | 5/1969 | Canterbury | 137/550 |
| 3,782,213 | 1/1974 | Rattunde | 474/28 |
| 4,143,558 | 3/1979 | van Deursen et al. | 474/28 |
| 4,190,025 | 2/1980 | Wahl | 474/110 X |

FOREIGN PATENT DOCUMENTS 2118083 1/1973 Fed. Rep. of Germany .
2857335 4/1980 Fed. Rep. of Germany .
2330920 3/1977 France .

Primary Examiner—James A. Leppink
Assistant Examiner—Thuy M. Bui
Attorney, Agent, or Firm—Cushman, Darby & Cushman

[57] ABSTRACT

The invention relates to an infinitely variable transmission provided with an endless transmission member and at least one V-shaped pulley of which at least one sheave is rigidly connected to a hydraulic cylinder-piston unit for the axial displacement of this sheave. The said cylinder-piston unit being provided with a pressure-equalizing chamber for the compensation of pressure rises in the cylinder space due to centrifugal forces. The pressure-equalizing chamber can be supplied with fluid from the cylinder space through a charging port. In order to overcome the drawback of particles obstructing regularly the charging port, ahead of the charging port a filtering member is provided through which the fluid flow must pass.

5 Claims, 2 Drawing Figures

INFINITELY VARIABLE TRANSMISSION

The invention relates to an infinitely variable transmission provided with an endless transmission member and at least one V-shaped pulley of which at least one sheave is rigidly connected to a hydraulic cylinder-piston unit for the axial displacement of this sheave, the said cylinder-piston unit being provided with a pressure-equalizing chamber for the compensation of pressure rises in the cylinder space due to centrifugal forces, which pressure-equalizing chamber can be supplied with fluid from the cylinder space through a charging port. The endless transmission member may, for instance, be a V-belt and the specification will therefore invariably refer to a V-belt.

Such an apparatus is know from the German patent application No. DE-AS-2 118 083 which describes a number of embodiments of a cylinder that is integral with a sheave in which the piston is rigidly connected to the shaft of the pulley and provided with a charging port connecting the cylinder space with the equalizing chamber. The piston is designed to form the partition wall between the cylinder space and the equalizing chamber. A variation in the cross-sectional surface area of the equalizing chamber makes it possible to opt between an undercompensation, an overcompensation and complete compensation.

Fluid flows, whether or not continuously, from the cylinder space through the charging port to the pressure-equalizing chamber and from thence outwards in order to maintain the equalizing chamber, even in spite of fluctuating volume, at a complete fluid filling whose pressure near the rotation shaft equals the ambient pressure. The volume of this fluid flow depends on the pressure in the cylinder space produced by the supply of fluid to that space (which results in a clamping force between the sheaves) and on the size of the charging port. To this end, means are provided according to the Netherlands patent application No. NL-OA-7513019 for complete or partial closure of the charging port. The patent application Nos. DE-AS-2 118 083 and NL-OA.7513019 clearly represent the essence of the prior art.

The charging port must afford wholly unimpeded passage at all times and must not become clogged with contaminants which may find their way into the oil through wear. The prior art fails to comply with this requirement. In an attempt at improvement, a length of wire has been fitted in the charging port, whilst both ends of the said wire have been bent so as to restrict its axial displacement. As fluid flows through the charging port, the wire is moving and would be expected to loosen any blocking particles present, which would then be washed away. The particles remain suspended in the fluid and may cause renewed blockage, which is one of the reasons why the wire does not fulfil its duty adequately.

The object of the present invention is to provide means for overcoming the drawback of particles obstructing regularly the charging port.

According to the invention this is achieved by incorporating a filtering member ahead of the charging port on the side of the cylinder space, through which member the fluid flow must pass on its way to the charging port, and which member contains a number of passages whose bore is smaller than that of the charging port, whilst the overall area of the combined bores exceeds the bore of the charging port.

The filtering member according to the invention preferably contains a filter gauze with apertures (size of mesh) from 0.3 to 0.9 times the bore of the charging port and with an overall effective surface area from 10 to 25 times the surface area of the charging port.

Such a screen placed ahead of an orifice is known as such. For the present apparatus this screen presents advantages over the aforesaid provision of a wire. As the wire occupies part of the passage, the orifice must be chosen relatively large. Floating particles may be retained by the wire screen, so that they cannot block the charging port. It stands to reason that the entire screen may ultimately become clogged. In actual practice it has been found that, given proper dimensioning, no blocking occurs during the operating period of the transmission.

Furthermore, according to a preferred embodiment, the charging port and the screen form part of a plug which may be inserted into a wider aperture in the cylinder, thereby facilitating exchange and/or adaptation. In addition, there are manufacturing advantages to be discussed hereinafter.

Figure 2:
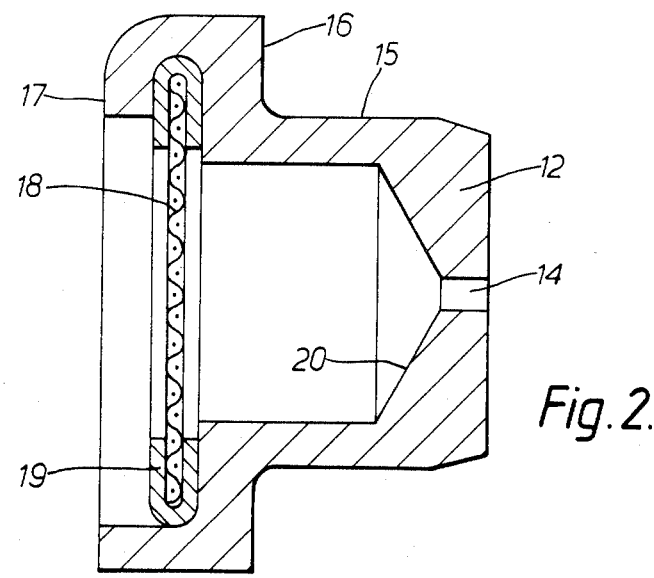

The invention will now be elucidated with reference to the accompanying drawings, in which FIG. 1 represents a partial longitudinal section of a pulley, one of whose sheaves is integral with a hydraulic piston unit, and FIG. 2 depicts a detail of a plug with orifice and screen.

A shaft 1 has a pulley sheave 2 rigidly attached to it. A movable pulley sheave 3 is mounted on the shaft 1 so as to be axially displaceable and yet capable of rotating with it, for instance by means of a keyway. A V-belt 4 may be looped over the V-shaped pulley formed by the two sheaves 2 and 3. The running diameter of the belt 4 depends on the distance between the pulley sheaves 2 and 3. Sheave 3 is integral with the cylinder wall 5 which extends coaxially round the shaft 1 and encompasses a cylinder space 6. This cylinder space 6 is closed by a piston 7 which fits sealingly against the cylinder wall 5 with the aid of an O-ring 8. A spring 9 provides a certain pre-load relative to the pressure exerted by the V-belt 4 whereby the zero position of the V-belt is determined.

Fluid can be passed under pressure to the cylinder space 6 through ducts 10 and 11, so that a pressure builds up in the cylinder space 6 and sheave 3 is pushed towards sheave 2. As a result, the V-belt 4 is subjected to a clamping force which affects both the running diameter of the V-belt 4 and the tension in the belt.

Fluid flows through a charging port in plug 12 into an equalizing chamber 13 which communicates with the ambient atmosphere through an annular slit between the outer circumference of the extension of piston 7 and a more or less radially disposed section of the cylinder wall 5. The slit is of such a width that the pressure in the equalizing chamber 13 near the slit is substantially equal to the ambient pressure, so that the pressure in the equalizing chamber 13 upon rotation of the cylinder-piston unit is virtually only generated by centrifugal forces. The pressure in the equalizing chamber results in a decrease in clamping force and therefore offsets the additional pressure in the cylinder space at least partly.

Now the supply of fluid to the equalizing chamber takes place from the cylinder space 6 through the charging port 14 in plug 12, which is represented in more detail in FIG. 2.

According to the example shown in FIG. 2, the plug 12 has a charging port 14 which provides the connection between the chambers 6 and 13. Plug 12 can be fitted into an aperture in the piston 7 in any known fashion. Preferably the outer circumference 15 is cylindrical and plug 12 is pressed into the aperture in piston 6 as far as the collar bound 16. This collar also contains a meshed wire screen 18 which is accommodated in a stainless steel frame 19. The collar 16 is preferably folded round the frame 19 of the screen but locking by means of peening is also possible.

Over and above the aforesaid, features of the invention are the manufacturing advantages of the plug with respect to the drilling of an accurately dimensioned small hole in the piston, the interchangeability and the possibility of achieving a judicious styling by simple means. Thus, the charging port terminates in a bevelled wall 20. Also, the installation of a screen without making use of the plug construction is not directly possible.

By way of example, the orifice 14 may have a diameter of 0.45 mm and the inlet port a diameter of 8 mm (corresponding with the surface of the screen 18). Gauze 18 has a mesh size of 0.25 mm and is made of stainless steel wire with a wire gauge of 0.15 mm. The material of the plug may be, for instance, a copper-zinc alloy such as material No. 2,0331,10 according to DIN 17671.

Obviously, means to compensate for the additional pressure built up in the cylinder space 6 in proportion to the square of the number of revolutions, as described in patent application No. NL-OA-7513019, can be combined in simple fashion with the provision claimed in the present invention.

I claim:

1. An infinitely variable transmission provided with an endless transmission member and at least one V-shaped pulley of which at least one sheave is rigidly connected to a hydraulic cylinder-piston unit for the axial displacement of the sheave, the said cylinder-piston unit having a cylinder space and being provided with a pressure-equalizing chamber for the compensation of pressure rises in the cylinder space due to centrifugal forces, which pressure-equalizing chamber can be supplied with fluid from the cylinder space through a charging port, wherein upstream of the charging port, on the side of the cylinder space, a filtering member in the form of a meshed wire screen is provided through which the fluid flow passes on its way to the charging port and which member contains a number of passages whose bores are from 0.3 to 0.9 times that of the charging port, the overall area of the combined bores being from 10 to 25 times the area of the bore of the charging port.

2. An infinitely variable transmission provided with an endless transmission member and at least one V-shaped pulley of which at least one sheave is rigidly connected to a hydraulic cylinder-piston unit having a cylinder space for the axial displacement of the sheave, the cylinder-piston unit being provided with a pressure-equalizing chamber for the compensation of pressure rises in the cylinder space due to centrifugal forces, which pressure-equalizing chamber can be supplied with fluid from the cylinder space through a charging port, wherein upstream of the charging port, on the side of the cylinder space, a filtering member, containing a meshed wire screen is provided through which the fluid flow passes on its way to the charging port and which member contains a number of passages whose bore is smaller than that of the charging port, the overall area of the combined bores exceeding the bore of the charging port, the charging port and the meshed wire screen forming part of a plug which can be attached in an aperture in the piston of the cylinder-piston unit.

3. An infinitely variable transmission according to claim 2, characterized in that the plug includes a collar which at least partially overlies an edge portion of the screen in order to secure the screen in position.

4. An infinitely variable transmission according to claim 3, characterized in that plug is integrally incorporated with means for compensating the additional pressure which is built up in the cylinder space in proportion to the square of the number of revolutions of the pulley.

5. An infinitely variable transmission according to claim 2, characterized in that the aperture width of the meshed wire screen is from 0.3 to 0.9 times the bore of the charging port and the overall effective surface area from 10 to 25 times the surface area of the charging port.

* * * * *